United States Patent [19]

Kerr, III et al.

[11] Patent Number: 5,973,020
[45] Date of Patent: Oct. 26, 1999

[54] PHOTOINITIATOR COMPOSITION INCLUDING HINDERED AMINE STABILIZER

[75] Inventors: Stuart R. Kerr, III, Rock Hill; Reeshemah L. Beaty, Chester, both of S.C.

[73] Assignee: Rhodia Inc., Cranbury, N.J.

[21] Appl. No.: 09/003,397

[22] Filed: Jan. 6, 1998

[51] Int. Cl.⁶ ........................................... C08F 2/46
[52] U.S. Cl. ................... 522/25; 522/31; 522/26; 522/148; 522/170; 522/99; 525/40
[58] Field of Search ................ 522/25, 26, 30, 522/148, 170, 99, 31; 525/40

[56] References Cited

U.S. PATENT DOCUMENTS

| | | | |
|---|---|---|---|
| 4,069,054 | 1/1978 | Smith | 96/115 |
| 4,069,056 | 1/1978 | Crivello | 96/115 |
| 4,450,360 | 5/1984 | Crivello et al. | 260/440 |
| 4,576,999 | 3/1986 | Eckberg | 525/476 |
| 4,640,967 | 2/1987 | Eckberg | 528/26 |
| 4,684,726 | 8/1987 | Greco et al. | 544/69 |
| 4,751,138 | 6/1988 | Tumey et al. | 428/323 |
| 4,946,880 | 8/1990 | Costanzi et al. | 524/96 |
| 4,952,619 | 8/1990 | Greco et al. | 524/96 |
| 4,977,259 | 12/1990 | Greco et al. | 544/69 |
| 4,988,607 | 1/1991 | Ali | 430/271 |
| 5,068,153 | 11/1991 | Barstotti et al. | 428/413 |
| 5,340,989 | 8/1994 | Cavezzan et al. | 528/19 |
| 5,494,943 | 2/1996 | Mahoney et al. | 522/66 |
| 5,554,664 | 9/1996 | Lamanna et al. | 522/25 |
| 5,672,637 | 9/1997 | Mahoney et al. | 522/25 |
| 5,693,688 | 12/1997 | Priou | 522/25 |
| 5,703,137 | 12/1997 | Priou et al. | 522/25 |

*Primary Examiner*—Samuel A. Acquah
*Assistant Examiner*—Saza McClendon
*Attorney, Agent, or Firm*—Andrew M. Solomon

[57] ABSTRACT

The present invention relates to a photoinitiator composition that can be used to initiate polymerization upon exposure to radiation. The said composition includes both a composition which yields cations upon exposure to actinic radiation, such as an iodonium borate initiator and a stabilizing amino agent. The amino agent is a secondary or tertiary amine having the general formula (VIII), a sterically arranged cyclic amine having the general formula (IX), or an amine consisting of groups that have the general formulas (VIII) and (IX) and that are interconnected.

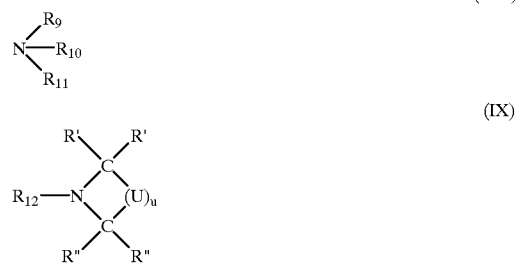

The compositions are particularly useful when used in conjunction with polyorganosiloxane monomers and when exposed to ultraviolet radiation.

16 Claims, No Drawings

PHOTOINITIATOR COMPOSITION INCLUDING HINDERED AMINE STABILIZER

BACKGROUND OF THE INVENTION

1. Field of the Invention

The present invention relates to stable photoinitiator compositions used to polymerize or crosslink another composition containing polymerizable or crosslinkable groups. More specifically, the compositions include both a compound which liberates cations upon exposure to actinic radiation, preferably an iodonium borate, and a hindered amine. The hindered amine acts to stabilize the composition to provide it with an extended shelf-life, particularly when the cationic liberating compound is present in a diluent liquid.

2. Technology Description

It is known that anti-adhesive coatings can be obtained through the use of compositions having a base of a polyorganosiloxane with functional groups (of the epoxy or vinyl ether type, etc.), to which a cationic onium salt is added in order to function as a polymerization initiator (see U.S. Pat. No. 4,450,360, No. 4,576,999, and No. 4,640,967).

It has been observed that the best results are obtained with onium salts whose anion is $SbF_6^-$. However, the initiators that contain this type of anion are difficult to handle and can pose significant toxicity risks.

The compound used as the photoinitiator is typically a solid, but for practical applications and to provide enhanced performance is often maintained in a liquid form by dissolving or dispersing it in a diluent. An example of this type of technology is described in U.S. Pat. No. 5,703,137 wherein ester diluents, such as n-butyl lactate are used as reactive diluents for onium salt photoinitiators.

When the photoinitiator is stored in liquid form, it can have a tendency to degrade and to display a reduced level of performance if it is used after having been stored for a long time. While not wishing to be bound by any specific theory, the inventors hypothesize that some cations must be liberated from the photoinitiator during the storing period.

In addition, when selecting certain diluents for the photoinitiator, it is believed that a minute amount of a premature reaction between the diluent with the cations generated from the photoinitiator compound may yield potentially harmful by-products.

Accordingly, there exists a need in the art for a photoinitiator composition having excellent stability and which does not release potentially harmful by-products when used.

SUMMARY OF THE INVENTION

In accordance with the present invention there is provided a cationic photoinitiator composition having excellent stability and which does not release potentially harmful by-products when used. More specifically, the inventors have surprisingly discovered that the stability and toxicity properties of cationic photoinitiators can be significantly improved by associating with the cationic compound a hindered amine.

More specifically, a first embodiment of the present invention provides a composition comprising:

(a) a compound which liberates cations upon exposure to actinic radiation; and (b) an amine stabilizer.

In particularly preferred embodiments, the compound which liberates cations upon exposure to actinic radiation is an onium borate, even more preferably an iodonium borate, and the hindered amine includes one or more secondary or tertiary amino groups. In still other preferred embodiments, the composition further includes a reactive or non-reactive diluent, with diacetone alcohol being particularly preferred.

The photoinitiator composition is used to polymerize or crosslink one or more materials containing polymerizable or crosslinkable groups. It is particularly preferred that the novel initiators be used to initiate crosslinking of polyorganosiloxane materials including one or more crosslinkable groups such as vinyl or epoxy groups. The photoinitiator can also be used to polymerize or crosslink non-silicone containing materials which contain epoxy groups.

Another embodiment of the present invention is directed to a method for polymerizing or crosslinking a composition comprising the steps of:

(1) providing a compound having polymerizable or crosslinkable groups;

(2) adding to the compound a crosslinking or polymerizing effective amount of an initiator composition comprising:

(a) a compound which liberates cations upon exposure to actinic radiation; and (b) a hindered amine stabilizer;

(3) exposing the resulting composition to actinic radiation so that the initiator composition yields one or more cations; and (4) cationically polymerizing or crosslinking the polymerizable or crosslinkable groups.

It is an object of the present invention to provide a photoinitiator composition which has excellent stability properties.

It is a further object of the present invention to provide a photoinitiator composition which does not yield a significant amount of toxic by-products when stored and/or used.

A still further object of the present invention is to provide a process for using the novel photoinitiator.

These and other objects will be readily apparent to those skilled in the art as reference is made to the detailed description of the preferred embodiment.

DETAILED DESCRIPTION OF THE PREFERRED EMBODIMENT

In describing the preferred embodiment, certain terminology will be utilized for the sake of clarity. Such terminology is intended to encompass the recited embodiment, as well as all technical equivalents which operate in a similar manner for a similar purpose to achieve a similar result.

The inventors have discovered and refined new cationic photoinitiator compositions useful for initiating polymerization or crosslinking of compounds having polymerizable or crosslinkable functional groups that display virtually none of the disadvantages of the compositions described in the prior art. In particular, the said new compositions include a stabilizing amino agent and display greatly improved stability during storage and during use. Moreover, uncontrolled polymerization reactions within the compositions are virtually eliminated, without inhibiting the ability of the said compositions to crosslink under controlled conditions.

The new compositions in accordance with the invention consist basically of the following components:

a compound that yields cations upon exposure to actinic radiation, and particularly exposure to ultraviolet (UV) radiation (i.e., "the photoinitiator"); and an amino agent which has properties that noticeably improves the stability during storage and use of the photoinitiator.

The compound which liberates cations upon exposure to actinic radiation in accordance with the invention comprises any compound or mixture of compounds which can liberate one or more cations upon exposure to actinic radiation (e.g., infrared, electron beam, visible light or ultraviolet radiation), and preferably is derived from onium salts. In particular, the onium salts are selected from among at least one element that is selected from groups 15 to 17 in the periodic table (*Chem. & Eng. News,* Vol. 63, N° 5 (Feb. 4, 1985), p. 26) and whose cationic entity and anionic entity are defined hereinbelow. Mixtures of photoinitiators are specifically contemplated as falling within the scope of the present invention.

The cationic entity of the onium salt is selected from among:

(1) The onium salts that have the formula $[(R_1)_n—A—(R_2)_m]^+$ (I) in which:
  "A" represents an element in a group from 15 to 17, such as I, S, Se, P, and N;
  The $R_1$ symbol represents a carbocyclic or heterocyclic aryl radical that has from 6 to 20 carbon atoms, which is preferably phenyl, tolyl or toluyl, with the said heterocyclic radical optionally containing at least one heteroatom, which is preferably nitrogen and/or sulfur;
  The $R_2$ symbol represents $R_1$, an alkyl radical, or a linear or branched alkenyl radical containing from 1 to 30 carbon atoms;
  The said $R_1$ and $R_2$ radicals may optionally be substituted by one or more of the following: an alkoxy group that contains from 1 to 25 carbon atoms; an alkyl group containing from 1 to 25 carbon atoms; a nitro group, a chloro group, a bromo group, a cyano group, a carboxyl group, and/or a mercapto group;
  n is an integer ranging from 1 to v+1, where v is the valence of element A; and
  m is an integer ranging from 0 to v−1, where n+m=v+1.

(2) The salts of oxoisothiochromanium having the following general formula:

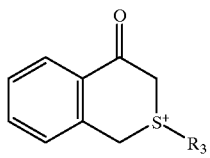

in which the $R_3$ symbol represents a linear or branched alkyl radical containing from 1 to 20 carbon atoms; a linear or branched cycloalkyl radical containing from 1 to 20 carbon atoms, or an aryl radical.

For example, the salts of oxoisothiochromanium that can be used are, in particular, the ones described in patent application No. WO A90/11303 (published on Oct. 4, 1990). The salts of oxoisothiochromanium that are particularly well suited include, in particular, the sulfonium salt of 2-ethyl-4-oxoisothiochromanium or of 2-dodecyl-4-oxoisothiochromanium.

The anionic entity of the said onium salt is selected from among the group consisting of $SbF_6^-$, $PF_6^-$, $AsF_6^-$, $CF_3SO_3^-$, $BF_4^-$, $BCl_4^-$, $B(O_3SCF_3)_4^-$, $B(O_3SC_2F_5)_4^-$, and $B(O_3SC_4F_9)_4^-$. However, other anionic entities may also be used, such as the ones described in patent application No. EP-A 697 449 (page 4, lines 28 to 37).

Furthermore, in the case of a anionic entity consisting of borate, the said entity may be selected from among the group consisting of entities having the general formula $[BX_a(R_4)_b]^-$ (II), which also includes $BF_4^-$ and $BCl_4^-$, and in which:
  a is an integer between 0 and 4,
  b is an integer between 0 and 4, with a+b=4,
  The X symbols represent:
    a halogen atom, preferably a chlorine or fluorine atom; or
    an —OH function, with a=0 to 2,
  The $R_4$ symbols are either the same or different, and represent:
    a phenyl radical substituted by at least one electron-attractor group, preferably $CF_3$, $OCF_3$, $NO_2$, or CN, or by at least 2 halogen atoms, preferably fluorine atoms;
    an aryl radical containing at least two aromatic rings, such as diphenyl or naphthyl, optionally substituted by at least one element or one electron-attractor group, preferably $CF_3$, $NO_2$, or CN, or a halogen atom, particularly a fluorine atom.

The anionic entity that consists of a borate is advantageously selected from among the following anions:

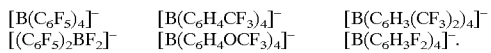

The onium salts having the general formula (I) are described in many documents, particularly in the following patents: U.S. Pat. No. 4,026,705, No. 4,069,056, No. 4,136,102, and No. 4,173,476. In particular, the following cations are employed within the context of the invention:

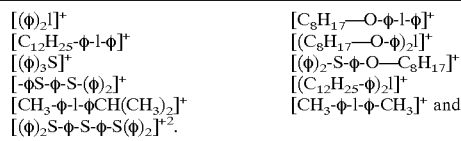

The initiators that are employed in accordance with the invention advantageously consist of the following onium borates:

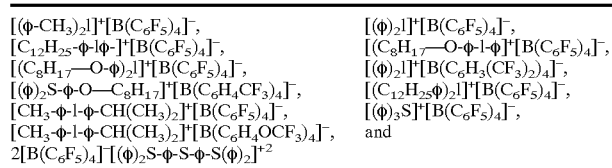

wherein φ in the above formulas represents a phenyl radical.

The onium borates used in the compositions in accordance with the present invention may be prepared by means of an exchange reaction between a salt of the cationic entity with a salt of an alkaline metal (for example, sodium, lithium, or potassium) of the anionic entity. The salt of the cationic entity may, for example, be a halide, such as a chloride or an iodide, while the alkaline metal of the salt of the anionic entity may be sodium, lithium, or potassium.

The operating conditions (i.e., the respective quantities of the reagents, the selection of the solvents, the duration, the temperature, and the presence or absence of stirring) are known and within the capabilities of those skilled in the art. The said conditions should allow the desired initiator salt to be recovered in solid form, through filtration of the precipitate that is formed, or else in the form of an oil, through extraction with an appropriate solvent.

The alkaline metal salts of the anionic entity may be prepared in accordance with known procedures, through an exchange reaction between a halogen-borate compound and an organometallic compound (such as a magnesium, lithium, or tin compound) that contains the desired hydrocarbon groups in stoichiometric quantities. The said reaction may optionally be followed by hydrolysis, with the aid of an aqueous solution of the halide of the alkaline metal. This type of synthesis is described, for example, in *J. of Organometallic Chemistry,* Vol. 178 (1979), pp. 1–4; *J.A.C.S.,* Vol. 82 (1960), p. 5298; *Anal. Chem. Acta,* Vol. 44 (1969), pp. 175–183; patents U.S. Pat. No. 4,139,681 and No. DE-A-2 901 367; and *Zh. Org. Khim.,* Vol. 25, No. 5 (May 1989), pp.1099–1102.

The photoinitiator compound is usually in the form of a solid (i.e., a powder), and when used is usually in the form of a solution in a solvent or diluent. The proportions, by weight, between the photoinitiator or -initiators, on the one hand, and the solvent, on the other hand, are between 0.1 and 99 parts for every 100 parts of solvent, and preferably from 10 to 50 parts.

The solvents that can be utilized for the photoinitiator are extremely numerous and varied, and are selected in accordance with the photoinitiator that is used and in accordance with the other constituents of the composition in accordance with the invention.

Generally speaking, the solvents may be alcohols, esters, ethers, ketones, chlorinated compounds, or nitrites.

Alcohols that may be selected include isopropyl alcohol, isobutyl alcohol, n-butyl alcohol, methyl isobutyl carbinol, diacetone alcohol, 2-ethylhexanol, para-tolyl-ethanol, isopropyl benzyl alcohol, benzyl alcohol, methanol and ethanol. The commonly used ethers are 2-methoxy ethanol, 2-ethoxy ethanol, diethylene glycol, and polyethylene glycol 200. The customary esters are dibutyl maleate, dimethylethylmalonate, methyl salicylate, dioctyl adipate, butyl tartrate, ethyl lactate, n-butyl lactate, and isopropyl lactate. Other solvents that can be used for the photoinitiator bath and that fall into the other categories of solvents mentioned hereinabove include acetonitrile, benzonitrile, acetone, cyclohexanone, tetrahydrofuran, dichloromethane, and chlorobenzene. Of the above mentioned solvents/diluents, the use of diacetone alcohol is particularly preferred.

Furthermore, among the solvents that can be used to solubilize the photoinitiator(s), certain types of organic solvents that donate protons and that have an aromatic structure, as well as certain types of hydroxylated carboxylic acid esters, are capable not only of solubilizing the photo-initiators but also of significantly improving their performance, in terms of reactivity and kinetics. These types of solvents, which are known as "reactive diluents", are described hereinbelow, and are advantageously utilized as a solvent for the photoinitiator(s).

The type of solvent in which the photoinitiator is preferably solubilized is selected from among the hydroxylated carboxylic acid esters that are liquid at room temperature (23° C.) and that have the following general formula (IV):

(IV)

in which:

The $R_5$ and $R_6$ symbols are either identical or different, and represent:
  a linear or branched alkyl radical that has from 1 to 10 carbon atoms and may optionally be substituted by a linear or branched alkoxy group that has from 1 to 4 carbon atoms;
  a cycloalkyl radical that has from 4 to 10 carbon atoms and may optionally be substituted by one or more linear or branched alkyl or alkoxy groups that have from 1 to 4 carbon atoms;
  an aryl radical that has from 5 to 12 carbon atoms and may optionally be substituted by one or more linear or branched alkyl or alkoxy groups that have from 1 to 4 carbon atoms; and/or
  an aralkyl or aroxyalkyl radical in which the aryl portion is a group that has from 5 to 12 carbon atoms and that may optionally be substituted by one or more linear or branched alkyl or alkoxy groups that have from 1 to 4 carbon atoms, and the alkyl portion is a linear or branched group that has from 1 to 4 carbon atoms.

The $R_5$ symbol may also represent:
  a linear or branched alkoxy radical that has from 1 to 15 carbon atoms, and/or
  a cycloalkyloxy radical that has from 4 to 10 carbon atoms and that may optionally be substituted by one or more linear or branched alkyl or alkoxy groups that have from 1 to 4 carbon atoms.

When used as solvents, these hydroxylated carboxylic acid esters possess properties that enable a significant improvement in the reactive and kinetic performance of the photoinitiators, and also in the final properties of the crosslinked coatings obtained.

Specifically, the most worthwhile results are obtained with this type of solvent, which is formed by at least one hydroxylated carboxylic acid ester that has the general formula (IV), in which:

$R_5$ represents a linear alkyl radical that has from 1 to 3 carbon atoms, and $R_6$ represents a linear or branched alkyl radical that has from 2 to 6 carbon atoms.

More preferentially, the solvent utilized is formed by at least one ester of the lactic acid that has the general formula (IV) in which $R_5$ represents a methyl radical and $R_6$ represents a linear alkyl radical that has from 1 to 10 carbon atoms, for example any of the following radicals: methyl, ethyl, isopropyl, n-butyl, isobutyl, amyl, and octyl. In this case, the proportions, by weight, of the photoinitiators are from 10 to 50 parts for every 100 parts of solvent. This preferred family of solvents also has the advantages of being very economical, not particularly toxic, easy to handle, and compatible with the known initiator salts.

The other component of the inventive composition comprises at least one amine which functions as a stabilizing agent. The amine preferably has a boiling point is greater than 150° C. and preferably greater than 200° C. The said amine may be a secondary or tertiary amine.

Amines that can be used in the compositions in accordance with the invention include:

(1) A secondary or tertiary amine that has the following general formula (VIII):

(VIII)

in which $R_9$, $R_{10}$, and $R_{11}$ are identical and/or different, and are selected from among the group consisting of:
- a linear or branched monovalent alkyl, alkoxy, or alkylene radical that contains from 1 to 12 carbon atoms, and that may contain and/or be substituted by at least one heteroatom, preferably an oxygen, sulfur, or nitrogen atom (for example, in order to form a reactive function such as an epoxy, ketone, or hydroxyl group);
- a monovalent cycloalkyl radical that contains between 3 and 9 carbon atoms, and that may contain and/or be substituted by at least one heteroatom, preferably an oxygen, sulfur, or nitrogen atom (for example, in order to form a reactive function such as an epoxy, ketone, or hydroxyl group); and
- a hydrogen radical.

(2) Sterically arranged cyclic amines that have the following general formula (IX):

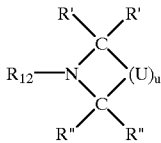

(IX)

in which:
$R_{12}$ corresponds to $R_9$,
R' and R" are identical or different, and correspond to linear or branched alkyl radicals that contains from 1 to 12 carbon atoms, and that may contain and/or be substituted by at least one heteroatom, preferably an oxygen, sulfur, or nitrogen atom (for example, in order to form a reactive function such as an epoxy, ketone, or hydroxyl group);
U is a free valence or a methylene radical, and u is between 1 and 9, in order to form a ring that can:
- contain at least one heteroatom, preferably an oxygen, sulfur, or nitrogen atom, and/or
- be substituted by at least one heteroatom or by a linear or branched alkyl radical that contains from 1 to 4 atoms, with the heteroatom preferably being an oxygen, sulfur, or nitrogen atom (for example, in order to form a reactive function such as an epoxy, ketone, or hydroxyl group).

(3) Amines consisting of groups having the general formulas (VIII) and (IX), interconnected by at least one saturated or unsaturated organic radical, and at least a divalent $R_{13}$ radical, which may contain and/or be substituted by a heteroatom.

As non-limiting examples, the $R_{13}$ radical may be selected from among the following radicals:
linear or branched alkylene radicals that have from 2 to 18 carbon atoms;
alkylene-carbonyl radicals whose alkylene portion, which may be linear or branched, contains from 2 to 20 carbon atoms;
alkylene-cyclohexylene radicals whose alkylene portion, which may be linear or branched, contains from 2 to 12 carbon atoms, and whose cyclohexylene portion includes an —OH group and optionally 1 or 2 alkyl radicals that contain 1 to 4 carbon atoms;
radicals having the formula —$R_{14}$—O—$R_{14}$, in which the $R_{14}$ radicals, which may be identical or different, represent alkylene radicals having from 1 to 12 carbon atoms;
radicals having the formula —$R_{14}$—O—$R_{14}$, in which the $R_{14}$ radicals have the meanings indicated hereinabove, and one or both of them are substituted by one or two —OH groups;
radicals having the formula —O—CO—$R_{14}$, in which the $R_{14}$ radical has the meaning indicated hereinabove,
radicals having the formula —$R_{14}$—COO—$R_{14}$, in which the $R_{14}$ radicals have the meanings indicated hereinabove,
radicals having the formula —$R_{15}$—O—$R_{16}$—O—CO—$R_{15}$, in which the $R_{15}$ and $R_{16}$ radicals, which may be identical or different, represent alkylene radicals having from 2 to 12 carbon atoms, and the $R_{16}$ radical is optionally substituted by an hydroxyl radical;
trivalent groups having the following formula:

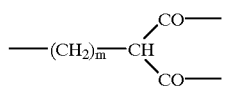

where m represents a number from 2 to 20, or trivalent groups having the following formula:

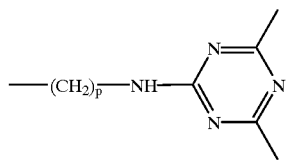

where p represents a number from 2 to 20.

The sterically arranged amines in accordance with the compositions in accordance with the invention include, at α in the nitrogen atom, alkyl groups that contain from 1 to 4 carbon atoms, and preferably methyl groups. In accordance with another preferred embodiment of the invention, the sterically arranged amines contain piperidino groups.

It should be noted that the majority of the sterically arranged amines used as light-stability agents, particularly those having hindered amines (i.e., those of the "HALS" type) have been shown to be excellent candidates for meeting the requirements for the stabilizers used within the context of the invention, even though their intrinsic property of stability in the presence of light has no direct relationship with the action mechanism of the stabilizing amino agents for the compositions in accordance with the invention. In this regard, various types of spatially arranged amines may be used, such as the ones described in EP 162 524 and No. EP 263 561. To the extent necessary for completion, the disclosures of these references are expressly incorporated by reference.

Many types of spatially arranged amines that are commercially available in the industrial field have provided good results. These amines include:
- The TINUVIN products sold commercially by the CIBA GEIGY company, and particularly the products known as TINUVIN 144 and TINUVIN 292, which have the general formulas (X) and (XI) respectively;
- The CYAGARD products sold commercially by CYTEC, and particularly the product known as CYAGARD UV 1164L; and The SANDUVAR products, and particularly the product known as SANDUVAR 3055, which has the general formula (XII) and which is sold commercially by the SANDOZ company.

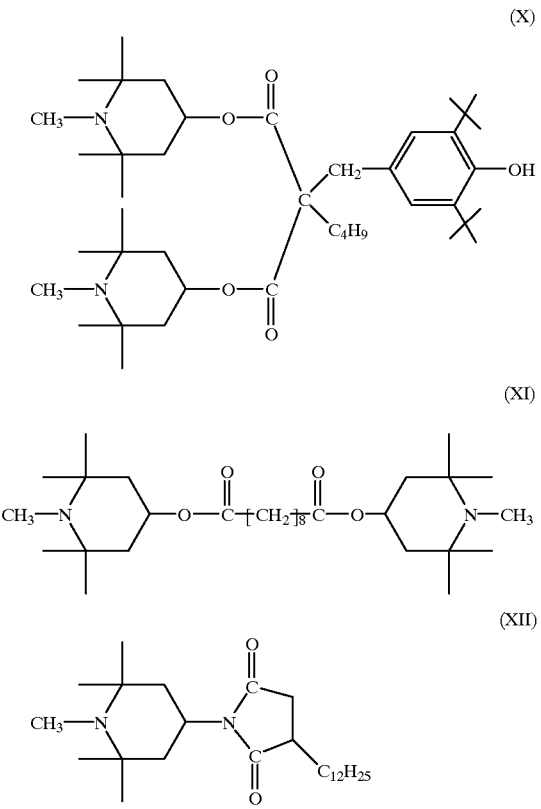

Of the above commercially available materials, the TINUVIN 292 compound is particularly preferred.

Other types of amines that have the general formulas (VIII) and (IX) are also good candidates for use in the compositions in accordance with the invention. As an example, the structure of some of these amines is given below:

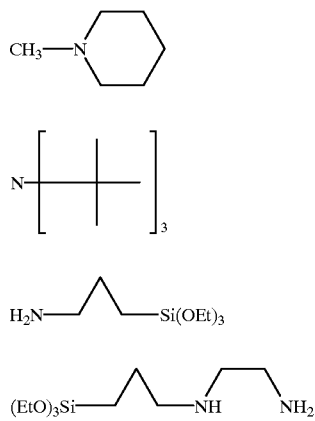

The percentage of the amino agent generally used, by weight in relation to the total weight of the photoinitiator compound (exclusive of any diluent), is between 0.2 and 0.8 percent by weight of photoinitiator solids and preferably between 0.3 and 0.7 weight percent. In the case of the HALS-type amino agent, the quantity is on the order of 0.4 to 0.6 weight percent.

The photoinitiator composition is used to initiate polymerization of one or more compounds or compositions which contains one or more functional groups which are crosslinkable or polymerizable through cationic crosslinking or polymerization. In practice, initiation occurs by exposing the photoinitiator to actinic radiation, which in turn, causes the release of one or more cations from the photoinitiator. The term "actinic radiation" is defined to mean any type of radiation which enables the liberation of cations from the photoinitiator. In practice, ultraviolet, visible light, infrared, electron beam or microwave radiation are particularly preferred sources of radiation, which an ultraviolet source operating at a wavelength of between about 200 and about 400 nanometers being most preferred.

In practice the compound or composition which contains one or more crosslinkable or polymerizable groups is either a polyorganosiloxane(s) having functional groups that can be crosslinked by cationic means or an ethylenically unsaturated compound or composition which is not a polyorganosiloxane and which contains one or more epoxy groups. In practice the concentration of the photoinitiator or -initiators that is present is between 0.05 and 2% by weight in the said bath, and preferably between 0.2 and 0.6% of the entire composition (initiator composition, polymerizable or crosslinkable compound/composition, and optional additives).

In particularly preferred embodiments, the compound/composition which contains one or more crosslinkable or polymerizable groups is a polyorganosiloxane, or mixture of polyorganosiloxanes. The polyorganosiloxanes that can be crosslinked by cationic means and that enter into the composition in accordance with the invention contain functional groups of the epoxy and/or vinyl ether type.

The said polyorganosiloxanes are linear or essentially linear, consist of groups that have the general formula (V), and are terminated by groups that have the general formula (VI) or else are cyclic and consist of groups that have the general formula, as indicated below:

in which:

The $R_7$ symbols are similar or different, and represent:
a linear or branched alkyl radical that contains from 1 to 8 carbon atoms and that may optionally be substituted by at least one halogen, preferably fluorine, with the alkyl radicals preferably consisting of the methyl, ethyl, propyl, octyl, and 3,3,3-trifluoropropyl radicals;
a cycloalkyl radical containing between 5 and 8 cyclic carbon atoms, which may optionally be substituted as set forth above;
an aryl radical containing between 5 and 12 carbon atoms, which may be substituted as set forth above, and which preferably consists of phenyl or dichlorophenyl; or
an aralkyl radical that has an alkyl portion that contains between 5 and 4 carbon atoms and an aryl portion that contains between 5 and 12 carbon atoms, which may optionally be substituted, on the aryl portion, by halogens, alkyl radicals, and/or alkoxy radicals containing from 1 to 3 carbon atoms;

The Y symbols are similar or different, and represent:
the $R_7$ group, a hydrogen radical, and/or
an organofunctional group that can be crosslinked by cationic means, and preferably an epoxyfunctional and/or vinyloxyfunctional group, linked to the silicon in the polyorganosiloxane by means of a divalent radical that contains from 2 to 20 carbon atoms, and that can contain at least one hetero-atom, preferably an oxygen atom; and
at least one of the Y symbols represents an organic functional group that can be crosslinked by cationic means.

Preferably, at least one of the $R_7$ symbols in the polyorganosiloxanes used in the compositions in accordance with the invention represents a phenyl, xylyl, tolyl, or dichlorophenyl radical.

It is also advantageous for at least 60% (molar) of the $R_7$ radicals in the polyorganosiloxanes used in the compositions in accordance with the invention to be methyl radicals.

In accordance with a preferred variant of the invention, from 1 to 50%, and preferably from 5 to 25% of the silicon atoms in the polyorganosiloxane include one crosslinkable functional group.

The epoxy functional Y groups are usually selected from among:

a)

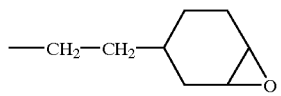

b)

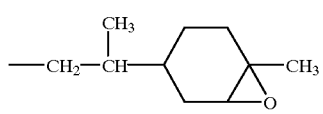

c)

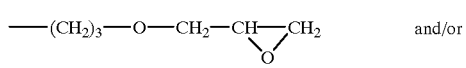

and/or d)

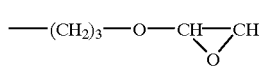

The functional groups preferably correspond to those of formula a).

Furthermore, the vinyloxyfunctional Y groups are usually selected from among:
$(CH_2)_3$—O—CH=$CH_2$
—O—$(CH_2)_4$—O—CH=$CH_2$ and/or
$CH_2)_3$—O—$R_8$—O—CH=$CH_2$
in which $R_8$ is:
a linear or branched alkylene radical that contains from 1 to 12 carbon atoms and that may be substituted as defined above; or
an arylene radical that contains from 5 to 12 carbon atoms and that is preferably phenylene and that may be substituted, preferably by from 1 to 3 alkyl groups that have from 1 to 6 carbon atoms.

More specifically, the polyorganosiloxanes used in the compositions in accordance with the invention have the following general formula (VIII):

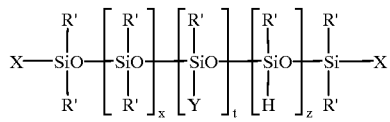

(VII)

in which:
The R' symbols have the same meaning as the $R_7$ symbols mentioned hereinabove for formulas (V) and (VI); and preferably, when R' is a linear or branched alkyl radical, it contains from 1 to 4 carbon atoms;

The X symbols are identical or different, and represent a monovalent radical selected from among the Y, H, and/or —OH radicals;

x is an integer or a fraction ranging from 20 to 150, and preferably from 30 to 100;

t is an integer or a fraction ranging from 3 to 9, and preferably from 6 to 9; and z is an integer or a fraction ranging from 0 to 5; and preferably from 0 to 2.

The epoxyfunctional polyorganosiloxanes can be prepared through an hydrosilylation reaction between oils with Si—H groups and epoxyfunctional compounds such as 1,2-epoxy-4-vinylcyclohexane and allyl glycidyl ether.

The vinylfunctional polyorganosiloxanes can be prepared through an hydrosilylation reaction between oils with Si—H groups and epoxyfunctional compounds such as allyl vinyl ether and allyl-vinyloxy ethoxy benzene.

The epoxyfunctional or vinyloxyfunctional polyorganosiloxanes used within the context of the invention are usually packaged in the form of fluids that have a dynamic viscosity of 10 to 10,000 mm$^2$ per second at a temperature of 25° C., and preferably a dynamic viscosity of 100 to 600 mm$^2$ per second at the said temperature.

The dynamic viscosity, at 25° C., of all of the silicones considered in the present description can be measured with the aid of a BROOKFIELD viscometer, in accordance with AFNOR standard No. 76-102 (February 1972).

The compositions in accordance with the invention may also include other ingredients, such as adhesion modulators that make it possible to increase or reduce the adhesion forces obtained from the polyorganosiloxane alone (e.g., linear silicone resins or polymers that contain vinyl, epoxy, vinyl ether, or alcohol functions); pigments; photosensitizers; antifungal, antibacterial, and antimicrobial agents; corrosion inhibitors, etc.

Preferred compounds or compositions which contain crosslinkable or polymerizable groups which are not based on silicone chemistry include the following: aliphatic and aromatic epoxy resins. monomers and polymers.

The compositions in accordance with the invention which include the compound or composition containing crosslinkable or polymerizable groups are useful in the field of anti-adhesion coatings on cellulose materials, films, paint, the encapsulation or embedding of electrical and electronic components, coatings for textile fabrics, and for sheathing for optical fibers.

They are particularly worthwhile when they are utilized in liquid form in order to render a material (such as metal sheets or foils, glass, plastic materials, or paper) non-adhesive with regard to other materials to which it would otherwise normally adhere.

The compositions in accordance with the invention advantageously display a degree of viscosity that does not exceed 5000 mPa/s, and that preferably does not exceed 4000 mPa/s at 25° C. As a variant, compositions may be preferred whose bath viscosity is between 200 and 1000 mPa/s at 25° C.

The invention also relates to a procedure that makes it possible to render the surface of a first article (for example, sheets) non-adhesive when in contact with the surface of a second article, in instances in which the surface of the said first article would normally adhere to the surface of the second article. The process for doing this involves the following steps:

(1) providing a compound having polymerizable or crosslinkable groups;
(2) adding to the compound a crosslinking or polymerizing effective amount of an initiator composition comprising:
   (a) a compound which liberates cations upon exposure to actinic radiation; and
   (b) a hindered amine stabilizer;
(3) exposing the resulting composition to actinic radiation so that the initiator composition yields one or more cations; and
(4) cationically polymerizing or crosslinking the polymerizable or crosslinkable groups.

In preferred embodiments, this procedure for the preparation of an article with a non-adhesive surface includes the following steps:

a) Applying a quantity of the composition in accordance with the invention, usually between 0.1 and 5 grams per square meter of the surface area of the said article; and
b) then crosslinking the composition by applying energy, which is provided at least in part, and preferably entirely, by UV radiation.

The UV radiation that is utilized has a wavelength between 200 and 400 nanometers (nm). The duration of the irradiation stage may be brief—generally less than 1 second—and may be on the order of a few hundredths of a second for very thin layers of compositions deposited onto the surfaces in question. The crosslinking advantageously takes place without the application of any heat. However, the invention does not exclude a step consisting of heating to a temperature between 25 and 100° C.

Furthermore, the hardening time can be regulated, particularly through the number of UV lamps utilized, through the duration of the exposure to UV radiation, and through the distance between the composition and the UV lamp.

The compositions that do not include a solvent (i.e., the non-diluted compositions) are applied with the aid of devices that are suitable for depositing, in a uniform manner, small quantities of the fluids onto a surface. For this purpose, one may for example use a "Helio-glissant" device, which specifically consists of two superimposed cylinders. The function of the lower cylinder, which is immersed in the coating receptacle that contains the composition, is to impregnate, in the form of a very thin layer, the upper cylinder, whose function is then to deposit onto the paper the desired quantities of the composition with which the said upper cylinder has been impregnated. Such a quantification is obtained through the adjustment of the respective speed of the two cylinders, which rotate in opposite directions in relation to one another.

The quantities of the compositions deposited onto the substrates are variable, in most cases ranging from 0.1 to 5 grams per square meter of the surface area treated. These quantities depend on the nature of the substrates and on the desired anti-adhesion properties. In most instances, the said quantities are between 0.5 and 3 grams per square meter for non-porous substrates.

The coated articles, materials, or substrates may subsequently be placed in contact with other adhesive materials, such as for example certain rubber or acrylic materials. After contact has been made through the application of pressure, the adhesive materials can easily be detached from the article that has been coated with the photo-crosslinked article.

While not wishing to be bound to any particular scientific theory, the inventors have surprisingly discovered that the presence of the amine in combination with the photoinitiator provides a significant increase in the shelf-life of the initiator. This is particularly pronounced when a diluent is associated with the initiator. It is speculated that when a diluent is present, there may be a premature release of cations from the initiator, thereby reducing its efficacy and long-term stability as a result of increased acidity of the composition. It is further believed that the amine functions to sequester any cations that are inadvertently released, thereby preventing degradation of the material.

In addition, when a diluent is present, by-products of the diluent could be formed which can potentially pose environmental and disposal problems. Again, while not wishing to be bound to any particular scientific theory, it is believed that such by-products do not form as a result of the amine/initiator/diluent interactions.

The invention is further described in the following non-limiting examples.

COMPARATIVE EXAMPLE 1

20 parts of tetrakis (pentafluorophenyl) borate tolylcumyliodonium having the following general formula:

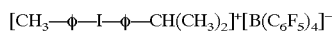

are added to 80 parts of diacetone alcohol. The iodonium borate is prepared in accordance with the general procedure described in European patent applications No. 562 922 and No. 562 897. To the extent necessary for completion, the disclosures contained therein are expressly incorporated by reference.

EXAMPLE 2

To the composition of Comparative Example 1 is added 1000 parts per million of the compound commercially available as TINUVIN 292 from Ciba Geigy. Its chemical structure is believed to be shown in the following formula.

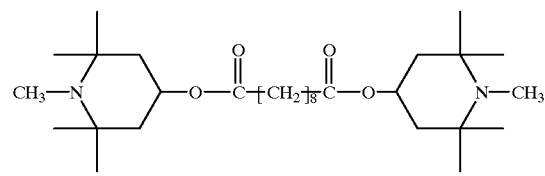

Testing of Example Compositions
(1) Aging Stability

The respective compositions are tested for age stability by pH measurement over a period of time. Two storage conditions are utilized; one at 70° F., the other at 120° F. Maintaining as high of a pH as possible over the storage time period is a desired result. The results are shown in the attached tables. Values in the tables are pH units.

|  | Comparative Example 1 Composition | Example 2 Composition |
|---|---|---|
| Months @ 70° F. | | |
| 0 | 6.21 | 8.37 |
| 0.25 | 6.2 | 7.5 |
| 0.5 | 4.16 | 7.44 |
| 0.75 | 3.72 | 7.12 |
| 1 | 4.42 | 6.84 |
| 2 | 4.49 | 6.4 |
| 3 | 4.98 | 6.02 |
| 4 | 4.38 | 6.43 |
| 5 | 4.53 | 5.89 |
| 6 | 4.49 | 5.72 |
| 8.5 | 3.13 | 5.67 |
| Months @ 120° F. | | |
| 0 | 4.03 | 7.46 |
| 0.03 | 4.31 | 6.42 |
| 0.17 | 4.81 | 5.99 |
| 0.3 | 4.07 | 5.88 |
| 0.43 | 4.62 | 5.92 |
| 1.6 | 4.5 | 6.47 |
| 2.77 | 3.32 | 5.54 |
| 3.93 | 1.9 | 5.29 |
| 6.28 | 1.45 | 4.5 |

(2) Presence of By-Products

The diacetone alcohol diluent can generate and release mesityl oxide, an undesirable by-product, into the photoinitiator solution over time. The percent of mesityl oxide present in the initiator after storage at both 70° F. (storage for about 8 months) and 120° F. (storage for about 5.7 months) is measured. The amount of mesityl oxide present in the initiator (percent by weight) after storage is shown in the following table.

| Storage Temperature | Sample | Percent Mesityl Oxide |
|---|---|---|
| 70° F. | Comparative Example 1 | 0.5 |
| 70° F. | Example 2 | 0.3 |
| 120° F. | Comparative Example 1 | 24.8 |
| 120° F. | Example 2 | 0.8 |

The above data suggests that the TINUVIN 292 hindered amine light stabilizer [HALS] effectively retards the gradual "acidification" of the cationic photoinitiator which results from the spontaneous degradation of the iodonium-borate salt. It is believed that the TINUVIN 292 accomplishes this feat by helping maintain the pH neutrality of the iodonium-borate/di-acetone alcohol solution as well as acting as an efficient acidic hydrogen proton [H+] scavenger. In addition, by retarding the "acidification" of the iodonium-borate/di-acetone alcohol solution, the TINUVIN 292 indirectly helps to prevent the "acid promoting" degradation of the di-acetone alcohol diluent which generates undesirable mesityl oxide.

The composition of Example 2 is used to initiate polymerization and/or crosslinking of a cationic reactive polyorganosiloxane containing epoxy reactive groups which is ultimately used to form an anti-adherent coating. The efficiency of the photinitiator of Example 2, even one which has been stored for over six months, exceeds that of comparative photoinitiators which do not contain the amine stabilizing agent. This is presumably because of the stabilizer preventing in situ degradation of the photoinitiator composition over a period of time.

Having described the invention in detail and by reference to the preferred embodiments thereof, it will be apparent that modifications and variations are possible without departing from the scope of the appended claims.

What is claimed is:

1. A composition comprising:
    (a) a compound which liberates cations upon exposure to actinic radiation comprising:
        (1) at least one onium salt having a cationic portion of either formula (I):

$$[(R^1)_n-A-(R^2)_m]^+ \quad (I)$$

in which:
    A represents an element selected from the group consisting of I, S, Se, P, and N;
    $R^1$ represents a carbocyclic or heterocyclic aryl radical that has from 6 to 20 carbon atoms;
    $R^2$ represents $R^1$, an alkyl radical, or a linear or branched alkenyl radical containing from 1 to 30 carbon atoms;
    n is an integer ranging from 1 to v+1. where v is the valence of element A; and
    m is an integer ranging from 0 to v-1. where n+m=v+1;
    or
one or more salts of oxoisothiochromanium of formula:

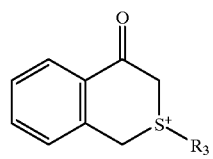

wherein $R_3$ represents a linear or branched alkyl radical containing from 1 to 20 carbon atoms; a linear or branched cycloalkyl radical containing from 1 to 20 carbon atoms, or an aryl radical; and
    (2) having an anionic portion of formula $$[BX_a(R_4)_b]^- \quad (II)$$

in which
    a is an integer between 0 and 3,
    b is an integer between 0 and 4, with a+b=4,
    X represents:
        a halogen atom, a=0 to 3; or
        an —OH function, with a=0 to 2;
    $R_4$ may be the same or different, and represents:
        a phenyl radical substituted by at least one electron-attractor group; or
        an aryl radical containing at lease two aromatic rings; and
    (b) an amine stabilizer which is selected from the group consisting of
        (1) A secondary or tertiary amine of formula (VIII);

(VIII)

in which $R_9$, $R_{10}$, and $R_{11}$ are identical and/or different, and are selected from the group consisting of:
    an unsubstituted or substituted linear or branched monovalent alkyl, alkoxy, or alkylene radical that contains from 1 to 12 carbon atoms;

an unsubstituted or substituted monovalent cycloalkyl radical that contains between 3 and 9 carbon atoms; and
a hydrogen radical;
(2) a sterically arranged cyclic amine of formula (IX):

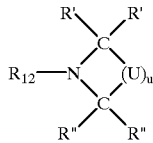

in which:
  $R_{12}$ is selected from the group consisting of:
    an unsubstituted or substituted linear or branched monovalent alkyl, alkoxy, or alkylene radical that contains from 1 to 12 carbon atoms;
    an unsubstituted or substituted monovalent cycloalkyl radical that contains between 3 and 9 carbon atoms; and
    a hydrogen radical;
  R' and R" are identical or different, and represent an unsubstituted or substituted linear or branched monovalent alkyl, alkoxy, or alkylene radical that contains from 1 to 12 carbon atoms;
  U is a free valence or a methylene radical, and u is between 1 and 9, in order to form a ring that can:
    contain at least one oxygen, sulfur, or nitrogen heteroatom, or
    be substituted by at least one heteroatom or by a linear or branched alkyl radical that contains from 1 to 4 atoms; and
(3) an amine comprised of groups having the general formulas (VII) and (IX), connected by either a chemical bond or at least one saturated or unsaturated organic radical having at least one divalent or trivalent $R_{13}$ radical selected from the group consisting of:
  linear or branched alkylene radicals that have from 2 to 18 carbon atoms;
  alkylene-carbonyl radicals whose alkylene portion, which may be linear or branched contains from 2 to 20 carbon atoms;
  alkylene-cyclohexylene radicals whose alkylene portion, which may be linear or branched, contains from 2 to 12 carbon atoms, and whose cyclohexylene portion includes an —OH group;
  radicals having the formula —$R_{14}$—O—$R_{14}$, —O—CO—$R_{14}$—, or —$R_{14}$—COO—$R_{14}$— in which the $R_{14}$ radicals, which may be identical or different, represent alkylene radicals having from 1 to 12 carbon atoms;
  radicals having the formula —$R_{15}$—$R_{16}$—O—CO—$R_{15}$—, in which the $R_{15}$ and $R_{16}$ radicals, which may be identical or different, represent alkylene radicals having from 2 to 12 carbon atoms;
  trivalent groups of formula:

—(CH$_2$)$_{\overline{m}}$—CH(CO—)(CO—)

where m represents a number from 2 to 20, and trivalent groups of formula

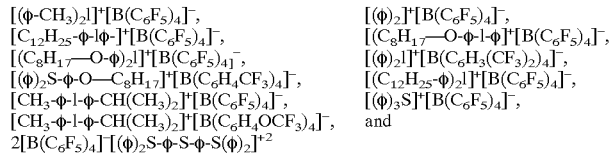

where p represents a number from 2 to 20.

2. The composition according to claim 1 wherein $R^1$ further contains nitrogen or sulfur heteroatoms.

3. The composition according to claim 1 wherein $R^1$ or $R^2$ are substituted by an alkoxy group that contains from 1 to 25 carbon atoms, an alkyl group containing from 1 to 25 carbon atoms, a nitro group, a chloro group, a bromo group, a cyano group, a carboxyl group or a mercapto group.

4. The composition according to claim 1 wherein component (a) is selected from the group consisting of

| | |
|---|---|
| $[(\phi\text{-}CH_3)_2I]^+[B(C_6F_5)_4]^-$, | $[(\phi)_2I]^+[B(C_6F_5)_4]^-$, |
| $[C_{12}H_{25}\text{-}\phi\text{-}I\phi\text{-}]^+[B(C_6F_5)_4]^-$, | $[(C_8H_{17}\text{—}O\text{-}\phi\text{-}I\text{-}\phi]^+[B(C_6F_5)_4]^-$, |
| $[(C_8H_{17}\text{—}O\text{-}\phi)_2I]^+[B(C_6F_5)_4]^-$, | $[(\phi)_2I]^+[B(C_6H_3(CF_3)_2)_4]^-$, |
| $[(\phi)_2S\text{-}\phi\text{-}O\text{—}C_8H_{17}]^+[B(C_6H_4CF_3)_4]^-$, | $[(C_{12}H_{25}\text{-}\phi)_2I]^+[B(C_6F_5)_4]^-$, |
| $[CH_3\text{-}\phi\text{-}I\text{-}\phi\text{-}CH(CH_3)_2]^+[B(C_6F_5)_4]^-$, | $[(\phi)_3S]^+[B(C_6F_5)_4]^-$, |
| $[CH_3\text{-}\phi\text{-}I\text{-}\phi\text{-}CH(CH_3)_2]^+[B(C_6H_4OCF_3)_4]^-$, | and |
| $2[B(C_6F_5)_4]^-[(\phi)_2S\text{-}\phi\text{-}S\text{-}\phi\text{-}S(\phi)_2]^{+2}$ | | wherein $\phi$ in the above formulas represents a phenyl radical.

5. The composition according to claim 1 wherein said amine is a sterically arranged amine that includes, at the a position to the nitrogen atom, alkyl groups that contain from 1 to 4 carbon atoms.

6. The composition according to claim 5 wherein said sterically arranged amine is an amine that contains at least one piperidino group.

7. The composition according to claim 1 wherein said amine is selected from the group consisting of:

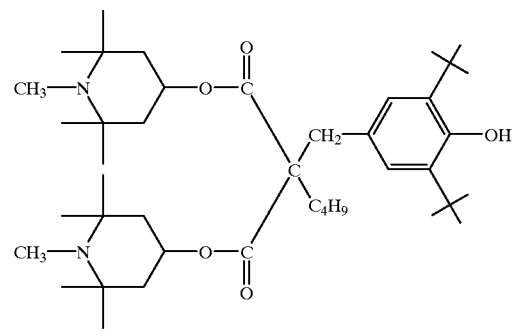

-continued

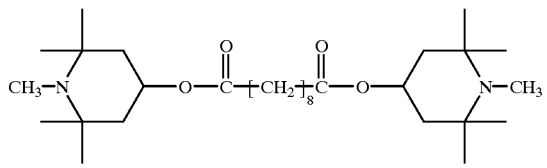

and

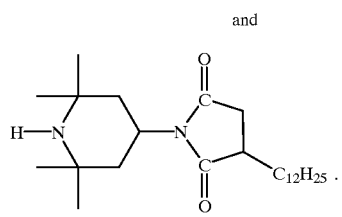

8. The composition according to claim 1 further comprising a diluent.

9. The composition according to claim 8 wherein said diluent is selected from the group consisting of alcohols, esters, ethers, ketones, chlorinated compounds and nitriles.

10. The composition according to claim 9 wherein said diluent is selected from the group consisting of isopropyl alcohol, isobutyl alcohol, n-butyl alcohol, methyl isobutyl carbinol, diacetone alcohol, 2-ethylhexanol, para-tolyl-ethanol, isopropyl benzyl alcohol, benzyl alcohol, methanol, ethanol, 2-methoxy ethanol, 2-ethoxy ethanol, diethylene glycol, polyethylene glycol 200, dibutyl maleate, dimethyl-ethylmalonate, methyl salicylate, dioctyl adipate, butyl tartrate, ethyl lactate, n-butyl lactate, isopropyl lactate, acetonitrile, benzonitrile, acetone, cyclohexanone, tetrahydrofuran, dichloromethane, and chlorobenzene.

11. The composition according to claim 10 wherein said diluent comprises diacetone alcohol.

12. The composition according to claim 8 wherein said diluent is a hydroxylated carboxylic acid ester of formula:

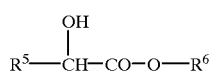

in which:

$R_5$ represents:
  a substituted or unsubstituted linear or branched alkyl radical that has from 1 to 10 carbon atoms;
  a substituted or unsubstituted cycloalkyl radical that has from 4 to 10 carbon atoms;
  a substituted or unsubstituted aryl radical that has from 5 to 12 carbon atoms;
  an aralkyl or aroxyalkyl radical in which the aryl portion is a substituted or unsubstituted aryl group that has from 5 to 12 carbon atoms, and the alkyl portion is a linear or branched group that has from 1 to 4 carbon atoms; or a linear or branched alkoxy radical that has from 1 to 15 carbon atoms; and $R_6$ represents:
  a substituted or unsubstituted linear or branched alkyl radical that has from 1 to 10 carbon atoms;
  a substituted or unsubstituted cycloalkyl radical that has from 4 to 10 carbon atoms;
  a substituted or unsubstituted aryl radical that has from 5 to 12 carbon atoms; or
  an aralkyl or aroxyalkyl radical in which the aryl portion is a substituted or unsubstituted aryl group that has from 5 to 12 carbon atoms, and the alkyl portion is a linear or branched group that has from 1 to 4 carbon atoms.

13. A composition of matter consisting essentially of a mixture of:

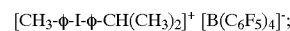

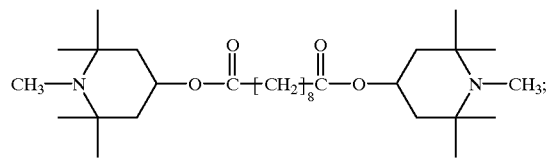

and

; and diacetone alcohol.

14. A process for polymerizing or crosslinking a composition comprising the steps of;

(1) providing a compound or composition having polymerizable or crosslinkable groups;

(2) adding to the compound or composition a crosslinking or polymerizing effective amount of an initiator composition comprising the composition of claim 1;

(3) exposing the resulting composition to actinic radiation so that the initiator composition yields one or more cations; and (4) cationically polymerizing or crosslinking the polymerizable or crosslinkable groups.

15. The process according to claim 14 wherein said compound having polymerizable or crosslinkable groups is selected from the group consisting of polyorganosiloxanes having functional groups that can be crosslinked by cationic means; and ethylenically unsaturated compounds or compositions which are not polyorganosiloxanes and contain one or more epoxy groups.

16. The process according to claim 15 wherein said actinic radiation comprises ultraviolet radiation.

* * * * *